United States Patent Office 2,880,086
Patented Mar. 31, 1959

2,880,086

LOW MELTING POINT NICKEL-IRON ALLOYS

Arthur T. Cape, Los Angeles, Calif., assignor to Coast Metals, Inc., Little Ferry, N.J., a corporation of Delaware No Drawing. Application March 6, 1957
Serial No. 644,203

3 Claims. (Cl. 75—171)

This invention relates to low melting point nickel-iron alloys, but more particularly to alloys of this type which are especially adapted for brazing purposes.

I have found, as the result of considerable experimentation, that the addition of iron, in substantial amounts, to nickel-base brazing alloys, will lower the melting points of such alloys to an extent which will greatly facilitate the application of such alloys to base metals.

In general, I find that the addition of from about 6% to about 40% of iron to nickel-base brazing alloys containing from about 51 to about 85% of nickel, will lower the melting point range to about 1700° F.–1850° F.

The alloys may, if desired, contain chromium in amounts up to about 10%, manganese in amounts up to about 10%, boron in amounts of from 1 to 5%, silicon in amounts of from .25 to 5%, and phosphorus in amounts of from 0 to 3%, for the purpose of improving certain properties of the alloys. The range of alloys encompassing the invention is accordingly as follows:

| | Percent |
|---|---|
| Nickel | 51–85 |
| Iron | 6–40 |
| Chromium | 0–10 |
| Manganese | 0–10 |
| Boron | 1–5 |
| Silicon | .25–5 |
| Phosphorus | 0–3 |

A preferred composition, within the above range contains 65% nickel, 25% iron, 3.5% boron, 4.5% silicon, and 1.25% phosphorus.

The following table shows the Rockwell C scale hardness and the melting points of several alloys within the foregoing range.

| Alloy No. | Fe | P | Ni | B | Si | Rockwell C | Melting Point, °F. |
|---|---|---|---|---|---|---|---|
| 1 | 14.5 | 1.25 | 77.15 | 3.6 | 4.5 | 57/58 | 1,700–1,750 |
| 2 | 24.5 | 1.25 | 67.15 | 3.6 | 4.5 | 54/58 | 1,700–1,750 |
| 3 | 34.5 | 1.25 | 57.15 | 3.6 | 4.5 | 53/57 | 1,700–1,750 |
| 4 | 10 | | 81.9 | 3.6 | 4.5 | 60/63 | 1,750 |
| 5 | 15 | | 76.9 | 3.6 | 4.5 | 59/62 | 1,750 |
| 6 | 20 | | 71.9 | 3.6 | 4.5 | 60/65 | 1,750 |
| 7 | 25 | | 66.9 | 3.6 | 4.5 | 57/65 | 1,750 |
| 8 | 30 | | 61.9 | 3.6 | 4.5 | 60/65 | 1,750 |
| 9 | 7.5 | | 84.4 | 3.6 | 4.5 | 55/58 | 1,800 |
| 10 | 40 | | 51.9 | 3.6 | 4.5 | 57/60 | 1,850 |

It will be understood that various changes in the alloy may be made, within the scope of the appended claims.

Having thus described my invention, I claim:

1. A nickel-iron alloy containing 51 to 85% nickel, up to 10% chromium, up to 10% manganese, 1 to 5% boron, .25 to 5% silicon, 0 to 3% phosphorus, and iron in an amount sufficient to bring the melting point of the alloy down to within the range of about 1700° F. to about 1850° F., the iron being not less than 6% and not more than 40% of the weight of the alloy.

2. A brazing alloy consisting of about 65% nickel, about 25% iron, about 3.5% boron, about 4.5% silicon, and about 1.25% phosphorus, said alloy having a melting point of 1700° F.–1750° F.

3. The method of lowering the melting point range of a nickel-base brazing alloy containing 51 to 85% nickel, 1 to 5% boron and .25 to 5% silicon, to about 1700° F. to about 1850° F., said method consisting in adding iron to said alloy in amounts of from about 6% to about 40%.

References Cited in the file of this patent

UNITED STATES PATENTS

| 1,514,064 | Mandell | Nov. 4, 1924 |
| 2,227,065 | Charlton | Dec. 31, 1940 |
| 2,743,177 | Cape | Apr. 24, 1956 |
| 2,762,706 | Cape | Sept. 11, 1956 |

OTHER REFERENCES

"Nickel Alloy Steels," International Nickel Co. Inc., 1934.

"Aufbau der Zweistufflegierungen," Hansen, page 697.